Patented Jan. 21, 1936

2,028,373

UNITED STATES PATENT OFFICE 2,028,373

MANUFACTURE OF 4-AMINODIPHENYLAMINE DERIVATIVES AND INTERMEDIATES OBTAINED THEREBY

Arthur Zitscher and Wilhelm Seidenfaden, Offenbach-on-the-Main, Germany, assignors to General Aniline Works, Inc., New York, N. Y., a corporation of Delaware No Drawing. Application March 10, 1933, Serial No. 660,285. In Germany March 10, 1932

7 Claims. (Cl. 260—69)

The present invention relates to the manufacture of 4-aminodiphenylamine derivatives and to intermediates obtained thereby.

We have found that uniform 4-aminodiphenylamine derivatives are obtainable by transforming such a diphenylamine derivative as contains in 3-position an alkoxy- or alkyl group and is not substituted in 4-position, in known manner, into the N-nitroso compound, transposing this compound to the nuclear-nitroso compound and treating the latter with a reducing agent as, for instance, an alkali metal sulfide, an alkali metal hydrosulfide, hydrosulfite, zinc dust in the presence of an acid or an alkali, stannous chloride or the like.

It is surprising that the presence of the alkoxy- or alkyl group in 3-position directs the nitroso group entirely uniformly to the 4-position so that by reducing the nitroso body, there is obtained a 4-aminodiphenylamine derivative substituted in 3-position by said groups.

The alkoxy and alkyl groups differ from each other by their selective power so that in the presence of, for instance, alkoxy in 3-position and of alkyl in 3'-position the nitroso group is uniformly directed to the ortho-position to the alkoxy group. By substituting alkoxy or alkyl in 3-position and halogen in 3'-position, the nitroso group is likewise uniformly directed to the 4-position.

The nuclear-nitroso compounds obtained are characterized by the following general formula:

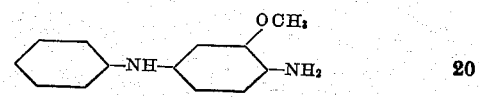

wherein X stands for alkoxy or alkyl and wherein the benzene nuclei may be further substituted by alkyl, alkoxy or halogen.

The following examples serve to illustrate the invention but they are not intended to limit the invention thereto, the parts being by weight:

(1) 199 parts of 3-methoxydiphenylamine are dissolved in 600 parts of glacial acetic acid, 125 parts of hydrochloric acid of 32.1% strength are added thereto and the whole is cooled to +5° C. At 5° C. to 15° C., there is added in the course of 1 hour a solution of 69 parts of sodium nitrite in 200 parts of water and stirring is continued for half-an-hour whereby 3-methoxy-N-nitrosodiphenylamine is formed. To the brown solution obtained, there are added with external cooling by means of ice water at 10° C. to 15° C. 250 parts of hydrochloric acid of 32.1% strength; the whole is stirred first at 10° C. to 15° C. for half-an-hour and, thereupon, at 25° C. to 30° C. for one hour whereby the nitroso group is transposed from the nitrogen to the nucleus. The mixture is poured into 3000 parts of water and the yellow 4-nitroso-3-methoxydiphenylamine which has been precipitated is filtered with suction and dissolved at 25° C. to 30° C. in 400 parts of caustic soda solution of 31.2% strength and 5000 parts of water; the solution obtained is reduced by means of a polysulfide solution prepared from 250 parts of crystallized sodium sulfide, 60 parts of sulfur and 100 parts of water at the temperature of the boiling water bath. After cooling, the whole is filtered by suction and the residue is washed until neutral. There is obtained with an excellent yield 4-amino-3-methoxydiphenylamine of the following formula:

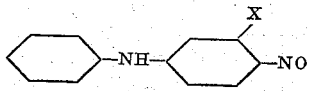

(2) 183 parts of 3-methyldiphenylamine are dissolved in 750 parts of alcohol and 125 parts of hydrochloric acid of 32.1% strength and transformed analogously to the statements in Example 1 into the 3-methyl-N-nitrosodiphenylamine; the latter is transposed into 4-nitroso-3-methyldiphenylamine which is reduced to 4-amino-3-methyldiphenylamine, melting at 77 to 78° C.

(3) 53 parts of 3-methoxy-3'-methyldiphenylamine are dissolved in 175 parts of alcohol and 28 parts of hydrochloric acid of 32.1% strength and the whole is cooled to 0° C. While well stirring, a solution of 18 parts of sodium nitrite in 100 parts of water is run thereto, stirring is continued for 1 hour at 10° C., the whole is diluted with 300 parts of water and the 3-methoxy-3'-methyl-N-nitrosodiphenylamine precipitated in the form of a feebly colored oil is taken up in 500 parts of ether. The ethereal solution obtained is cooled to +5° C. and, in order to transpose the nitroso group, 50 parts of alcoholic hydrochloric acid (containing 33 parts of hydrochloric acid in 100 parts of alcohol) are run thereto at 5° C. to 10° C.; stirring is continued for 1 hour at 15° C. to 20° C. After addition of the said alcoholic hydrochloric acid the solution becomes at once brown, after some time, the hydrochloride of 4-nitroso-3-methoxy-3'-methyldiphenylamine separates in the form of compact brown needles. It is filtered by suction, washed with ether and dried.

For the purpose of reduction, the hydrochloride of the nitroso body is dissolved in 60 parts of caustic soda solution of 31.2% strength and 1500 parts of water, thereupon, there is added to the red-brown solution obtained a solution of 100 parts of crystallized sodium sulfide in 100 parts of water and the whole is stirred at 65° C. to 70° C. for 1 hour whereby 4-amino-3-methoxy-3'-methyldiphenylamine separates in the form of an oil with a yield of 81% of the theoretical calculated upon 3-methoxy-3'-methyldiphenylamine; the oil is preferably transformed into the hydrochloride. After being allowed to stand for a prolonged time, the base solidifies and may be obtained in the form of prisms melting at 52° C. to 53° C. (uncorrected) by means of repeated recrystallization from benzene and ligroin. It corresponds to the following formula:

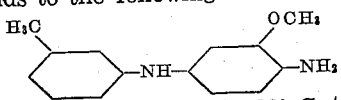

Its acetyl compound melts at 166° C. to 167° C. (uncorrected).

In a similar manner, there are obtained from 3,2'-dimethoxydiphenylamine the 4-amino-3,2'-dimethoxydiphenylamine, which crystallized from ligroin in the form of glittering laminæ melting at 104° C. to 105° C. (uncorrected), and from 3-methoxy-2'-ethoxydiphenylamine the 4-amino-3-methoxy-2'-ethoxydiphenylamine.

Analogously, other 4-aminodiphenylamine derivatives of this kind may be obtained as, for instance:

1. 4-amino-3-ethoxydiphenylamine. — Leaflets when recrystallized from ligroin, melting at 77° C. to 78° C., uncorrected.
2. 4-amino-3-n-propoxydiphenylamine. — Leaflets when recrystallized from benzene and ligroin, melting at 52° C. to 53° C., uncorrected.
3. 4-amino-3-n-butoxydiphenylamine. — Needles when recrystallized from benzene and ligroin, melting at 87° C. to 88° C., uncorrected.
4. 4-amino-3,6-dimethoxydiphenylamine. — Small needles when recrystallized from benzene and ligroin, melting at 117° C. to 118° C., uncorrected.
5. 4-amino-3-methoxy-5-methyldiphenylamine. — Needles when recrystallized from benzene and ligroin, melting at 64° C. to 65° C., uncorrected.
6. 4-amino-3-methoxy-6-methyldiphenylamine. — Needles when recrystallized from ligroin, melting at 80° C. to 81° C., uncorrected.
7. 4-amino-3-methoxy-2'-methyldiphenylamine. — Rhombs when recrystallized from ligroin and carbon tetrachloride, melting at 60° C. to 61° C., uncorrected—melting point of the acetyl compound: 144° C. to 145° C., uncorrected.
8. 4-amino-3-methoxy-2'-chlorodiphenylamine. — Needles when recrystallized from benzene and ligroin, melting at 84° C. to 85° C., uncorrected.
9. 4-amino-3-methoxy-2',5'-dimethyldiphenylamine. — Small needles, melting at 89° C. to 90° C., uncorrected, melting point of the acetyl compound: 129° C. to 130° C., uncorrected.
10. 4-amino-3-methoxy-2'-methyl-5'-chloro-diphenylamine. — Needles when recrystallized from ligroin, melting at 102° C. to 103° C., uncorrected.
11. 4-amino-3-methoxy-2',5'-dichlorodiphenylamine. — Leaflets when recrystallized from benzene and ligroin, melting at 116° C. to 117° C., uncorrected.
12. 4-amino-3,6-dimethyldiphenylamine. — Small needles when recrystallized from benzene and ligroin, melting at 86° C. to 87° C., uncorrected.
13. 4-amino-3-methyl-3'-chlorodiphenylamine. — Nearly colorless viscous oil, boiling at 188° C., under a pressure of 1 mm Hg—melting point of the acetyl compound: 144° C. to 145° C., uncorrected.
14. 4-amino-3-methoxy-3'-chlorodiphenylamine. — Feebly colored small needles, when recrystallized from benzene, melting at 79° C. to 80° C.—melting point of the acetyl compound: 136° C. to 137° C.
15. 4-amino-3-benzyloxydiphenylamine. — Leaflets when recrystallized from benzene and ligroin, melting at 153° C. to 154° C., uncorrected.
16. 4-amino-3,2'-dimethyl-6,5'-dichloro-diphenylamine. — Small needles when recrystallized from petroleum ether, melting at 81° C. to 82° C., uncorrected.
17. 4-amino-3-iso-propyl-oxydiphenylamine. — Needles when recrystallized from ligroin, melting point 73° C. to 74° C., uncorrected.
18. 4-amino-3,6-diethoxydiphenylamine. — Needles when recrystallized from ligroin and benzene, melting at 81° C. to 82° C., uncorrected.
19. 4-amino-3-cyclohexyl-oxydiphenylamine. — Felted needles when recrystallized from cyclohexane, melting at 100° C. to 101° C., uncorrected.

We claim:

1. The process which comprises acting with nitrous acid in acid medium on a diphenylamine compound substituted in 3-position by an alkoxy or methyl group, unsubstituted in 4-position treating the N-nitroso compound formed with a concentrated hydrohalic acid and causing a reducing agent to act upon the 4-nitroso compound, thus obtained.

2. The process which comprises acting with nitrous acid in acid medium on a diphenylamine compound of the following formula:

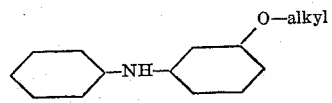

treating the N-nitroso compound formed with a concentrated hydrohalic acid and causing an alkali metal sulfide to act upon the 4-nitroso compound, thus obtained.

3. The process which comprises acting with nitrous acid in an acid medium on a diphenylamine compound substituted in 3-position by an alkoxy- or methyl group, unsubstituted in 4-position, and treating the N-nitroso compound formed with a concentrated hydrohalic acid.

4. The process which comprises acting with nitrous acid in an acid medium on a diphenylamine compound of the following formula:

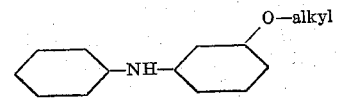

and treating the N-nitroso compound formed with a concentrated hydrohalic acid.

5. The compounds of the following general formula:

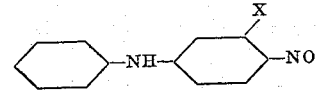

wherein X stands for alkoxy or methyl and wherein the benzene nuclei may be further substituted by methyl, alkoxy or chlorine, representing in crystalline form strongly colored bodies having metallic luster, capable of forming salts in the presence of acids and alkalies.

6. The compounds of the following formula:

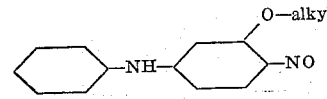

representing in crystalline form strongly colored bodies having metallic luster, capable of forming salts in the presence of acids and alkalies.

7. The compound of the following formula:

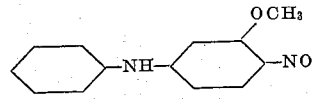

representing when recrystallized from xylene dark yellow needles having metallic luster, melting at 150° C. to 151° C. (uncorrected).

ARTHUR ZITSCHER.
WILHELM SEIDENFADEN.